(12) United States Patent
Bucella et al.

(10) Patent No.: US 7,453,677 B2
(45) Date of Patent: Nov. 18, 2008

(54) POWER AND SAFETY CONTROL HUB

(75) Inventors: Thomas John Bucella, Rochester, NY (US); Jeremy Michael Block, Walworth, NY (US); David Edward Fuchs, Pittsford, NY (US); Francis Joseph Testa, Fairport, NY (US); David William Sewhuk, Rochester, NY (US); David Roger Larson, Rochester, NY (US)

(73) Assignee: Teknic, Inc., Pittsford, NY (US)

( * ) Notice: Subject to any disclaimer, the term of this patent is extended or adjusted under 35 U.S.C. 154(b) by 498 days.

(21) Appl. No.: 11/153,110

(22) Filed: Jun. 15, 2005

(65) Prior Publication Data
US 2006/0072265 A1 Apr. 6, 2006

Related U.S. Application Data

(60) Provisional application No. 60/616,487, filed on Oct. 6, 2004.

(51) Int. Cl.
*H02H 7/00* (2006.01)
(52) U.S. Cl. ...................................... 361/62
(58) Field of Classification Search ............. 361/62
See application file for complete search history.

(56) References Cited

U.S. PATENT DOCUMENTS

| | | | |
|---|---|---|---|
| 4,172,980 A | 10/1979 | Hsieh et al. ............. 307/9 |
| 4,258,368 A | 3/1981 | Arnold et al. ............ 318/762 |
| 4,951,567 A | 8/1990 | Rodi et al. ............... 101/216 |
| 5,412,528 A | 5/1995 | Mader et al. ............. 361/62 |
| 5,455,735 A | 10/1995 | Zerega ................... 361/189 |
| 5,492,022 A | 2/1996 | Elias .................... 73/865.7 |
| 5,574,437 A | 11/1996 | Schwinn et al. .......... 340/679 |
| 5,983,373 A | 11/1999 | Lea ....................... 714/712 |
| 6,051,894 A | 4/2000 | Shimogama ............ 307/125 |
| 6,246,318 B1 | 6/2001 | Veil et al. .............. 340/458 |
| 6,249,060 B1 * | 6/2001 | Osha ................... 307/10.1 |
| 6,291,910 B1 | 9/2001 | Mori et al. ............ 307/125 |
| 6,459,956 B2 | 10/2002 | Matsumoto ............. 700/245 |
| 6,532,508 B2 | 3/2003 | Heckel et al. .......... 710/110 |
| 6,570,272 B2 | 5/2003 | Dickhoff ............... 307/113 |
| 6,611,416 B1 | 8/2003 | Cleereman et al. ...... 361/189 |
| 6,628,015 B2 | 9/2003 | Pullmann et al. ....... 307/326 |
| 6,711,698 B1 | 3/2004 | Marbach et al. ......... 714/4 |
| 6,778,079 B2 | 8/2004 | Weber .................. 340/500 |
| 6,778,080 B2 | 8/2004 | Veil et al. ............. 340/506 |
| 6,784,571 B2 | 8/2004 | Rupp et al. ............ 307/326 |
| 6,787,940 B2 | 9/2004 | Pullmann ............... 307/326 |
| 6,809,911 B2 | 10/2004 | Dickhoff et al. ........ 361/23 |

(Continued)

*Primary Examiner*—Stephen W Jackson
(74) *Attorney, Agent, or Firm*—Brown & Michaels, PC

(57) ABSTRACT

A power and safety control hub, integrating fault tolerant power disconnect control, software monitoring of disconnect and multi-voltage power distribution and disconnect with non-hazardous power control, EMI filtering and multi-circuit current protection in a single unit, coordinating shutdown of connected mechanical drives, commanding them to come to a controlled stop before safety power is disconnected. The hub may also integrates segmented hazardous power control and automatically discharge energy sources within connected mechanical drives at the time of safety power disconnect of hazardous power. The hub may also include internal self-protection that automatically forces a control safety power disconnect (after warning the host) if the unit should approach its maximum operating temperature, or if a cooling fan stops.

36 Claims, 8 Drawing Sheets

U.S. PATENT DOCUMENTS

| | | | |
|---|---|---|---|
| 6,812,596 B2 | 11/2004 | Veil | 307/326 |
| 6,825,579 B2 | 11/2004 | Ehrlich et al. | 307/113 |
| 6,832,343 B2 | 12/2004 | Rupp et al. | 714/47 |
| 6,914,763 B2 * | 7/2005 | Reedy | 361/64 |
| 7,138,729 B2 * | 11/2006 | Bailey | 307/45 |

* cited by examiner

POWER AND SAFETY CONTROL HUB

BACKGROUND OF THE INVENTION

1. Field of the Invention

The invention pertains to the field of power control, safety, and distribution equipment. More particularly, the invention pertains to a power and safety control hub for power control, safety control, and power distribution.

2. Description of Related Art

There is currently no device that constitutes a power and safety control hub for power control, safety control, and power distribution. As part of its function, a power and safety control hub of this type should integrate fault tolerant power disconnect control, software monitoring of disconnect and multi-voltage power distribution and disconnect with non-hazardous power control, EMI filtering and multi-circuit current protection in a single unit. There are presently some products and machines that incorporate some or part of these functions, but this is done on a custom-made basis for each machine model. There is no product at present that integrates all of these functions into a single integrated system for use as a power and safety control hub for overall power control, safety control and power distribution in many different applications. As used herein, an integrated system is the integration of components that form a power and safety control hub in one or more enclosures and/or printed wiring boards, that is provided as a single system.

As part of its function, such a hub should also implement electromagnetic, single fault tolerant, safety control circuits without using positively driven contact relays. Electromagnetic circuits which control hazardous power in machines that meet the CE machinery directive (and other machine safety standards) normally utilize interconnected relays with positively-guided contacts (in which one set of contacts can reliably be used to monitor the proper operation of the other contacts within the relay) as control elements. Alternately, safety control is sometimes implemented with completely redundant electronic control systems that must agree in order to turn on hazardous power. Both of these methods can be used to meet the requirements of fault tolerance (one element can fail and safety is maintained) and fault monitoring (any single fault can be detected). However, there is a need for a method for accomplishing these single fault tolerance and monitoring requirements without using either of these typically expensive techniques. Such a method currently does not exist.

Another part of its function should be coordination of the shutdown of any connected mechanical drives such as servo motor drives, autonomously commanding them to come to a controlled stop before safety power is disconnected (when networked controls are used). As used herein, mechanical drives would include any powered source of mechanical drive. Thus, mechanical drives would include, but are not limited to, motors, motor drives, servo motor drives, variable speed motor drives, pneumatics, hydraulics, and other devices supplying mechanical drive power. This is an extremely important safety feature that can be used to control hazardous equipment including electric motors, pneumatics, hydraulics, and other potentially dangerous powered equipment. However, there is currently no device that, when used with connected networked controls, automatically brings to a halt any connected mechanical drives in the split second before it removes power.

It should also integrate segmented hazardous power control (distinguishing between load/unload and main areas of the equipment being controlled) so that the main area can be operating while the load/unload area has power disconnected. Examples of equipment that operates in this way does exist, however, there are currently no integrated safety control products that accomplish this.

A power and safety control hub for overall power control, safety control and power distribution should also automatically discharge energy sources within connected mechanical drives (as previously defined) at the time of safety power disconnect of hazardous power. For example, servo motor drives, stepper motor drives and variable Speed drives often contain storage (smoothing, filtering) capacitors in their internals that store energy for some time after AC power is removed from the unit. The stored charge in these capacitors constitutes a hazard until they are discharged. There is, therefore, a need for circuits that can be connected to automatically discharge these capacitors at the time of removal of hazardous power. However, there are currently no integrated safety control products that accomplish this.

Such a power and safety control hub should also include a safety control and monitoring algorithm that automatically forces the test on e-stop switches and interlocks in a machine each time the machine is powered up (or reset). As used herein, interlocks are switches or devices that indicate that an operator is not in harms way from any of the hazards within the machine, including but not limited to, interlock switches, interlock switches with guard locking, light curtains, etc. Several safety control standards require the e-stop switch circuit to be checked for proper operation on a periodic basis. This is normally accomplished by a periodic preventative maintenance schedule outlined in the machine's instructions or by a placard in a conspicuous area (e.g. near the e-stop switch). However, there is nothing that avoids having to depend upon this type of relatively unreliable manual procedure for e-stop switches and interlocks.

The hub should additionally have a state driven safety control and monitoring algorithm that pinpoints at least one of wiring and device problems for rapid debug. This makes debugging of the system in the case of a safety fault much easier. However, there is currently no power and safety control hub for overall power control, safety control and power distribution that incorporates this feature.

It should also include internal self-protection that automatically forces a control safety power disconnect (after warning the host) if the unit should approach its maximum operating temperature, or if a cooling fan stops. This feature is not analogous to thermal shutdowns used in other products to protect circuitry in the vicinity from damage but rather to insure the proper integrity of the safety disconnect and it is not currently incorporated into any device.

A power and safety control hub for overall power control, safety control and power distribution should also incorporate safety monitoring software for synchronous de-bouncing interlocks and e-stop switch inputs to eliminate false trips. Mechanical switches have a property called "contact bounce". When a mechanical switch is closed or opened it does not typically do so in a single clean transition. The contacts typically bounce together and apart causing several short on-off transitions over a period that lasts a few milliseconds to a few hundred milliseconds. When these switch signals are used by electronics, these transitions can confuse the circuits unless they are de-bounced. De-bouncing can be done with either electronic circuits or software and is a well known technique. However, traditional de-bouncing of individual contact inputs is insufficient for applications that need to monitor simultaneous switch operation. If simple de-bouncing is employed, a subsequent algorithm is required to find out if the transitions are close enough to each other to be considered simultaneous. This usually makes the software code complicated and harder to construct, test and debug. Synchronous de-bouncing eliminates this requirement.

Another part of the hub's function should be to integrate a comprehensive audible indicator that announces the activation of any over current protection devices (e.g., blown fuses or tripped circuit breakers) as well as individual visual blown fuse or tripped circuit breaker indicators in the power distribution system. Although visual blown indicators for individual over current devices are common, there are no examples of a single comprehensive indicator that provides a signal (by sounds or otherwise) when there is any blown fuse or tripped circuit breaker in the power distribution product.

It could also include integration of an e-stop reset function into the machine on-off front panel switch. A common requirement of machine safety standards is the need for a separate reset switch for restoring hazardous power to a machine. Specifically, resetting the e-stop switch can't reapply hazardous power on its own. These safety standards state that the resetting of the e-stop switch simply arms the hazardous power control circuits (necessary, but not sufficient for the reapplication of hazardous power). These standards call for a separate reset switch, which must be deliberately actuated after the e-stop switch is reset, to restore hazardous power. There is, however, nothing that has a circuit that integrates the hazardous power reset switch function with the On-Off switch panel, allowing the On switch to double as the hazardous power reset switch.

Finally, a power and safety control hub for overall power control, safety control and power distribution should include integration of a "soft-off" circuit that automatically shuts off the machine when the host computer is shut down. The control of automated machines is often accomplished by a computer connected to sensors, actuator, indicators, operator controls and mechanical drives (either directly or through a network). The connected control computer may have a method of shutting itself down when requested to do so by its internal software (after being requested by the user, some internal event or an event detected within the machine). However, there is currently no device in the field that contains a circuit that can be used to extend this shutdown action to the entire machine when the host computer shuts down.

SUMMARY OF THE INVENTION

Our invention represents a significant advance in its field. It reduces engineering effort significantly, substantially reducing the time necessary to bring a system to market. It eases wiring requirements, lowering total machine costs. It also integrates numerous functions in one compact enclosure, supporting a smaller machine footprint. Finally, it speeds compliance inspection and testing of a machine for: EMC (electromagnetic compatibility); Machine Safety (mechanical hazards); and Electrical Safety (shock and fire hazards). It accomplishes these goals via several important innovations, as further outlined below.

First, our power and safety control hub for overall power control, safety control and power distribution integrates fault tolerant power disconnect control, software monitoring of disconnect and multi-voltage power distribution and disconnect with non-hazardous power control, EMI filtering and multi-circuit current protection in a single unit.

Second, our invention implements electromagnetic, single fault tolerant, safety control circuits without using positively driven contact relays. This is accomplished by connecting e-stop switches and interlocks in the following way: one pole of each switch is inserted in series with one pole from every other switch forming two separate strings (series) of contacts. Each of these strings of contacts are used to switch one side of the power to a hazardous load (or a contactor's coil that controls hazardous power). Both strings of switches must be closed in order to connect power to the hazardous load. By monitoring the voltage (diagonally) from the power source side of one string of switches to the load (contactor's coil) side of the other string of switches and vice-versa, both strings of contacts can be monitored.

Third, it coordinates the shutdown of any connected mechanical drives, autonomously commanding them to come to a controlled stop before safety power is disconnected (when networked controls are used).

Fourth, our invention integrates segmented hazardous power control (load/unload and main machine/equipment areas) so that the main area can be operating while the load/unload area has power disconnected. It thereby allows the main area of the machine to operate while an area of the machine used for the loading and unloading of work in and out of the machine by a human operator is rendered safe. This increases the machine's effective throughput in a manufacturing plant.

Fifth, our power and safety control hub for overall power control, safety control and power distribution automatically discharges energy sources within connected mechanical drives at the time of safety power disconnect of hazardous power.

Sixth, our power and safety control hub also includes a safety control and monitoring algorithm that automatically forces the test on e-stop switches and interlocks in a machine each time the machine is powered up (or reset). It avoids having to depend upon a voluntary or externally enforced manual procedure by forcing the operator to perform a test cycle for e-stops and interlocks before hazardous power can be applied, each time the machine is powered up (or upon a reset of the power and safety control hub from the host control software).

Seventh, it has a state driven safety control and monitoring algorithm that pinpoints at least one of wiring and device problems for rapid debug. This software algorithm stores in memory the last sequence of switching states which, once an error occurs, can easily be decoded to isolate a small fraction of the fault tree that could have caused that error. This makes debugging of the system in the case of a safety fault much easier.

Eighth, it includes internal self-protection that automatically forces a control safety power disconnect (after warning the host) if the unit should approach its maximum operating temperature, or if a cooling fan slows or stops. This feature specifically safeguards hazardous power disconnect devices and control circuits by forcing a safety shutdown—removing hazardous power before the temperature is elevated to a level that could cause unreliable operation of the safety control system. As such, this is an additional safeguard enhancing the functional reliability of the machinery safety system.

Ninth, our power and safety control hub for overall power control, safety control and power distribution incorporates safety monitoring software for the synchronous de-bouncing of the interlocks and e-stop switch inputs (as a vector) to eliminate false trips. Unlike former systems using electronic circuits or software, our system uses a software algorithm constructed to de-bounce switches when several switches must be monitored for simultaneous operation. In further contrast to prior art, our software processes the switch inputs as a vector, a binary number formed by the concatenation of the individual switch states.

Tenth, another part of our invention's function is to integrate a comprehensive audible overcurrent indicator (i.e., blown/tripped fuse/circuit breaker indicator) as well as individual visual overcurrent indicators in the power distribution system. A comprehensive audible indicator sounds if any one or more fuses or circuit breakers in the power distribution system blow or trip (fuse or circuit breaker open). Thus, it serves as a comprehensive indicator of an overcurrent event in a power distribution product.

Eleventh, our invention integrates an e-stop reset function into the machine on-off front panel switch. It has a circuit that integrates the hazardous power reset switch function with the On-Off switch panel, allowing the On switch to double as the hazardous power reset switch. The On-Off panel works in the following way: When the machine is powered off, actuating the On switch applies power to non-hazardous loads (the PC, display, sensors, network, etc.) If all interlocks are closed and the e-stop switch is cycled to check for proper operation, then the host controller can request hazardous power and it will be applied. Later, if an e-stop switch is struck and then returned to the "run" position, a hazardous power request from the host will be ignored until the On switch is actuated, thus the On switch has a dual function as an "On-Reset" switch, fulfilling the requirement of the safety standards for a separate hazardous power reset switch.

Twelfth our power and safety control hub for overall power control, safety control and power distribution includes a "soft-off" circuit that automatically shuts off the machine when the power supply voltage to host computer is shut down.

DETAILED DESCRIPTION OF THE INVENTION

Figure 1:
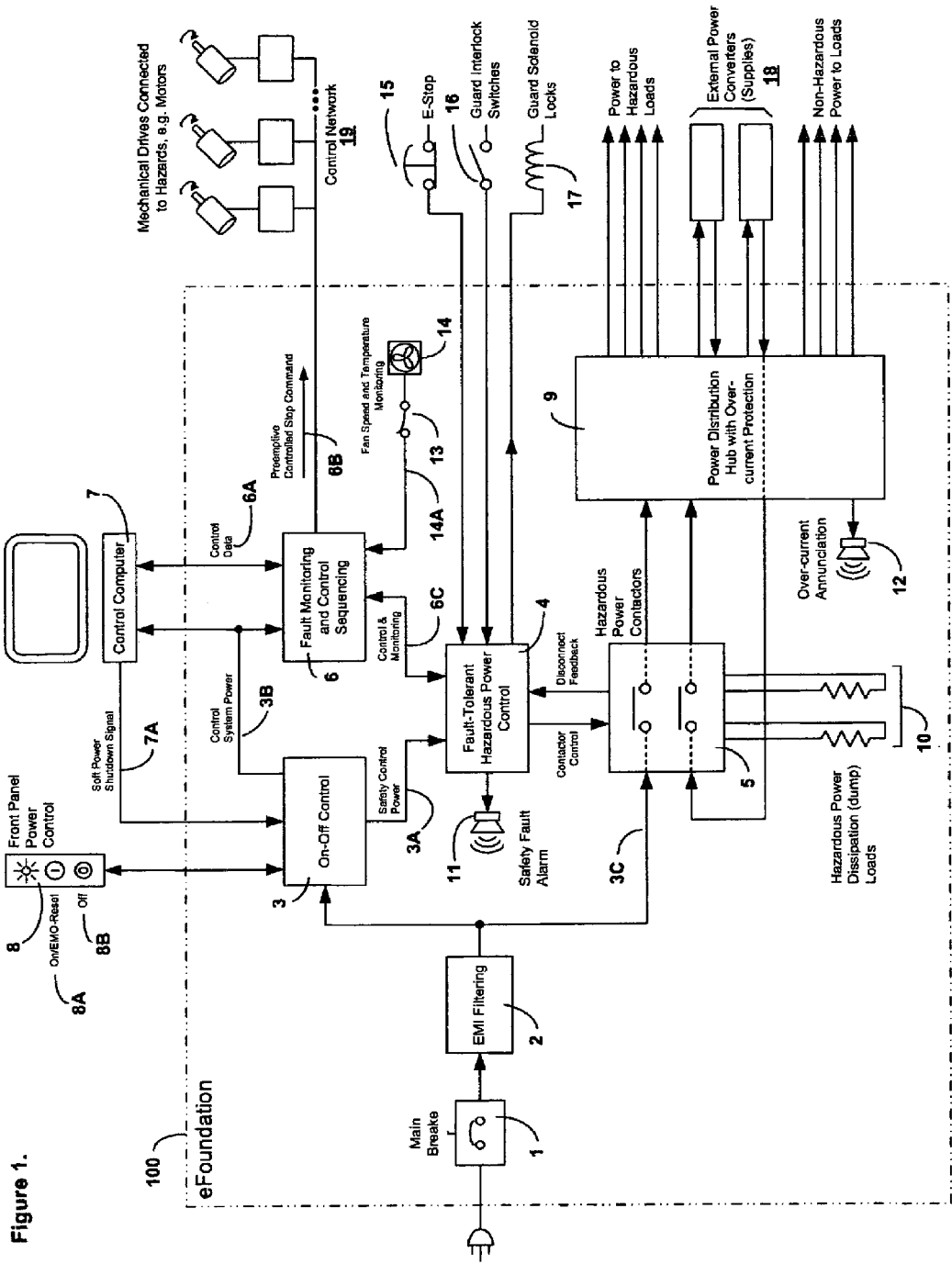
FIG. 1 provides a schematic diagram showing power and control features of our invention, particularly how controlling power is connected in various elements.

As previously noted, FIG. 1 provides an overview of our invention in the form of a schematic diagram showing power and control features of our power and safety control hub for power control, safety control, and power distribution ("control hub" 100). As it is an overview, the workings, features, internal components, and interconnections between many of the elements illustrated in FIG. 1 will be discussed with greater particularity in subsequent sections. (As further discussed below, FIG. 1 also shows various ancillary devices connected to and/or controlled by control hub 100 that are not part of control hub 100).

Nonetheless, in passing, it should be noted that control hub 100 includes a main breaker 1 and EMI filtering 2 as well as on-off control 3, which is connected to fault tolerant hazardous power control system 4. Hazardous power control system 4 is, in turn, linked to hazardous power contactors 5 and fault monitoring and control sequencing system 6. Also shown are ancillary apparatus and devices such as a control computer 7 capable of sending a soft power shutdown signal 7A and front panel control switch 8. Other elements of control hub 100 include power distribution hub 9, hazardous power dissipation loads 10, safety fault alarm 11, over-current annunciator 12, thermostat 13, cooling fan 14, and speed/thermostat monitoring signal 14A.

Further detail regarding hazardous contactors 5 and their operation is provided with reference to FIG. 2A, below. However, one of their salient features and functions is also evident when reviewing FIG. 1. When hazardous contactors 5 are turned off, they shunt power through the power distribution hub 9 into hazardous power dissipation loads 10. Thus, they serve to automatically discharge energy sources within connected mechanical drives (i.e., powered sources of mechanical drive) at the time of safety power disconnect of hazardous power.

In addition, control hub 100 automatically forces a controlled safety power disconnect (after warning the host) if the unit (control hub 100) should approach its maximum operating temperature, or if a cooling fan stops. Cooling fan 14 produces an output signal (or a speed-monitoring signal). A signal is also provided by thermostat 13. These signals (hereinafter referred to as speed/thermostat monitoring signal 14A) are constantly monitored by fault monitoring and control sequencing system 6. If fan 14 ceases or slows down, or thermostat 13 signals that the control hub 100 is too hot, the fault monitoring and control sequencing system 6 will alert host computer 7 via control data lines 6A and begin a count down while waiting for the host to take action. However, if the host fails to take action to alleviate the problem after a preset period of time (generally a period measured in seconds), sequencing system 6 will issue a pre-emptive controlled stop command 6B to control network 19. Then, after an additional delay, sequencing system 6 will act via control and monitoring connection 6C and fault-tolerant hazardous power control system 4 to remove power from all hazardous circuits.

Control hub 100 also includes a "soft-off" circuit that automatically shuts off control hub 100 when host computer 7 is shut down. Overall, control hub 100 is intended to deal with systems that include both hazardous and non-hazardous power. Hazardous power is controlled by computer 7 and fault monitoring and control sequencing system 6 via fault-tolerant hazardous power control system 4. Non-hazardous power is controlled by the on/off switch of front panel power control 8. It is also controlled via on-off control system 3. Control system 3 receives a soft power shutdown signal 7A from control computer 7 when its power is turned off. When it receives this signal, control system 3 shuts down all other non-hazardous power.

Figure 2A:
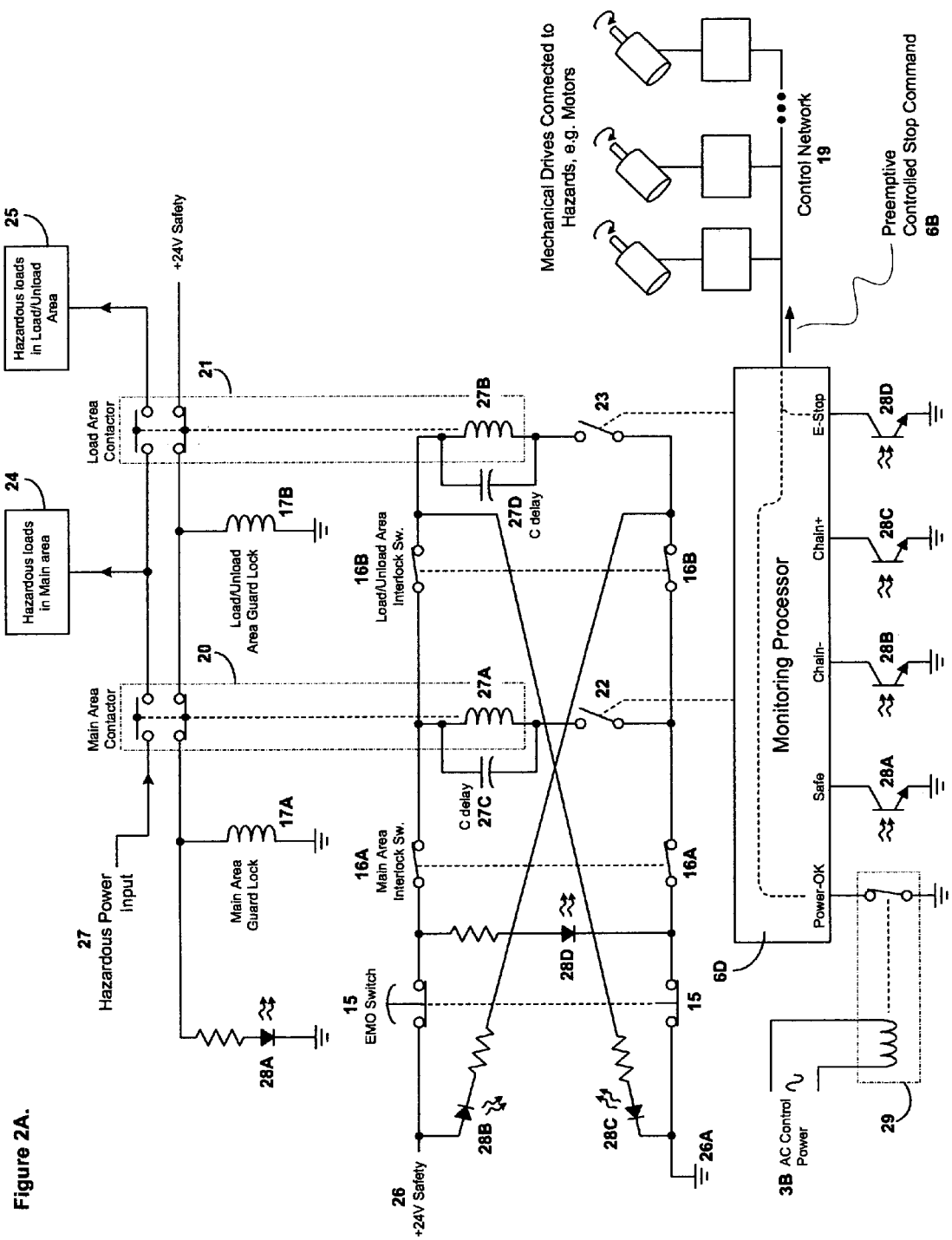
FIG. 2A provides a schematic diagram showing specific implementation hardware for the redundant power control circuit and monitoring system of our invention.

Further information regarding the elements comprising the control sequencing system 6, hazardous power contactors 5, fault tolerant hazardous control system 4, E-stop switch 15, interlocks 16, guard solenoid lock switches 17, external power converters 18, and other elements related to the operation of our control hub 100 (and their various interactions) can be derived from FIG. 2A. This figure provides a schematic diagram showing specific implementation hardware and connections related to the redundant power control circuits and monitoring systems of our invention. And, as will be noted, the fault tolerant safety control circuit and system illustrated does not rely on the use of positively driven contact relays as is typical in the art, but instead relies on a novel and unique arrangement of switches.

Power is provided to the elements of control hub 100 illustrated in FIG. 2A via a power source 26 (24 volts safety) with a ground 26A. It enters via EMO (or E-stop) switch 15. After this, it traverses two sets of contacts (interlocks 16). Each set of contacts, main area interlocks 16A and load/unload interlocks 16B, are mechanically linked (as indicated by the broken line connecting the switches of each set). So, when one switch of a set of interlocks 16A, 16B is open/closed—the other is necessarily open/closed.

The arrangement shown is tailored to the needs of industrial equipment and machine users. Usually, such equipment and machines have a load/unload area that can be accessed by the user and where materials enter and exit the machine. Likewise, it has a main area where the interior and working parts of the machine can be accessed for servicing or other purposes. It is necessary to shut off all hazardous power to the load/unload area when this area is being accessed. However, for efficiency, it is often desirable to be able to continue supplying hazardous power to (and to continue the operations of) the remainder of the equipment/machine even while loading/unloading is occurring. Thus, safety switches should ideally shut down hazardous power to the load/unload area when it is being accessed, while allowing hazardous power input to the main area. However, when the main area is being accessed, safety switches should shut down hazardous power to the main area and (because the equipment cannot continue to operate with this power shut down) also shut down power to the load/unload area. (Not all equipment is operated in this way; thus, some equipment applications may require the use of only one set of the switches shown). Finally, all hazardous power to both areas should be shut off instantly if an e-stop switch is hit.

The foregoing goals are accomplished in our invention. As FIG. 2A makes clear, in order for main contactor activation switch 22 to power main contactor actuator 27A to close main area contactor 20 (which is biased to an open position), main area interlocks 16A must also be closed—indicating that the area is not being accessed (i.e., is closed). Likewise, in order for load/unload contactor activation switch 23 to power load/unload contactor actuator 27B to close load area contactor 21 (which is also biased to an open position), main area interlocks 16A and load/unload area interlocks 16B must both be closed—indicating that both areas are not being accessed (i.e., are closed). Finally, EMO switches 15 breaks power instantly to both, withdrawing power from main contactor actuator 27A and load/unload contactor actuator 27B. This, in turn, allows main area contactor 20 and load area contactor 21 to return (after the time required to discharge the delay capacitors 27C and 27D associated with actuators 27A and 27B) to their normal open position.

At this point it should be noted that all of the foregoing features operate independently of the monitoring processor 6D of control sequencing system 6. As a matter of fact, they operate even if the relevant control switches (main contactor activation switch 22 and load/unload contactor activation switch 23) are closed/activated by monitoring processor 6D, creating a multiply redundant safety system. However, monitoring processor 6D also serves a vital role in detecting faults indicated to LED/photo-transistor based opto-isolators 28A, 28B, 28C and 28D, as well as in controlling activation of hazardous power (subject to the aforesaid safety systems). As will be noted, activation of safe mode opto-isolator 28A indicates that main area contactor 20 and load area contactor 21 are not closed. Thus, no hazardous power is being delivered and the machine being monitored is in safe mode. Likewise, deactivation of safe mode opto-isolator 28A indicates that one or both of main area contactor 20 and load area contactor 21 are closed and hazardous power is flowing to one or both of hazardous loads 24 in the main area or hazardous loads 25 in the load/unload area.

Deactivation of safe mode opto-isolator 28A also indicates that main area guard lock 17A of guard solenoid lock switches 17 cannot be operated. As an extra safety precaution, this guard lock—which is a powered solenoid used to unlock the access doors (or "guards") to this area—is only powered when both main area contactor 20 and load area contactor 21 are open. Thus, main area guard lock 17A is only powered and able to be used to unlock the main area when hazardous power is no longer flowing to main area hazardous loads 24 via main area contactor 20. However, as in the discussion above, it is often desirable to be able to unlock and access the load/unload area of the equipment even while hazardous power is flowing to the main area. Thus, load/unload area guard lock 17B of guard solenoid lock switches 17 is only denied power when hazardous power is flowing to hazardous loads 25 in the load/unload area.

The other opto-isolators 28B, 28C and 28D, also play a vital role in the functions of monitoring processor 6D in controlling hazardous power, in detecting system faults, and in reacting appropriately to system faults. In this regard, it is imperative that monitoring processor 6D be able to detect and respond appropriately to wiring faults and problems. In the system illustrated, first fault opto-isolators 28B and second fault opto-isolator 28C will only both be activated or both be deactivated if the system is operating properly. If one or the other is activated without the other, this indicates a fault such as a short or an electrical switch or contact that is stuck in an erroneous closed or open position.

The aforesaid feature serves as a fault detector for monitoring processor 6D, which can then take appropriate action by taking the system to safe state, disengaging main area contactor 20 and load area contactor 21, and thereafter confirming safe condition via reference to safe mode opto-isolator 28A. If a fault is detected and safe mode opto-isolator 28A does not indicate safe mode (or if EMO switch 15 breaks the circuit activating E-stop opto-isolator 28D, monitoring processor 6D will automatically send a pre-emptive controlled stop command 6B to the control network controlling mechanical drives connected to mechanical hazards. It will also open main contactor activation switch 22 and load/unload contactor activation switch 23. As previously noted, main contactor actuator 27A and load/unload contactor actuator 27B are provided with delay capacitors 27C and 27D (as illustrated in FIG. 2A) so as to maintain contactors 20, 21 in closed positions providing power to main area hazardous loads 24 and/or load/unload area hazardous loads 25 for a brief period after contactor activation switch 22 and/or load/unload contactor activation switch 23 are opened. This provides additional time (typically only a few hundred milliseconds) for the control network 19 to shut down mechanical drives connected to mechanical hazards in a systematic and orderly way. Overall, these features add still further layers of redundancy to the many protective features already described with reference to control hub 100.

Figure 2B:
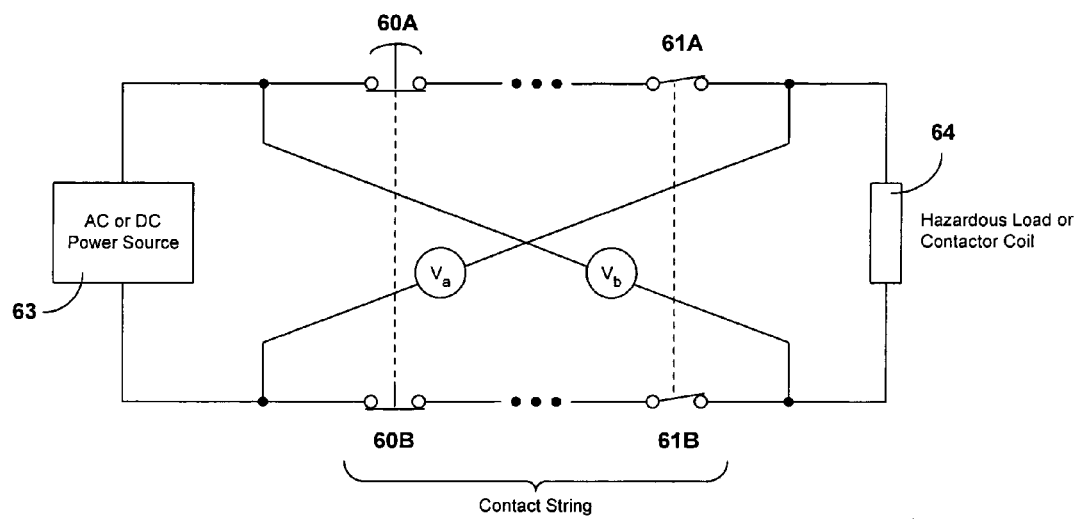
FIG. 2B provides a simplified schematic diagram further illustrating the fault monitoring system illustrated in FIG. 2A.

Further light is shed on the aforesaid fault monitoring system in FIG. 2B, which provides a simplified diagram for the purpose of elucidating the fault monitoring system's features and function. As will be noted, the various switches shown are interconnected in the following way—one pole of each switch is inserted in series with one pole from every other switch forming two separate strings (series) of contacts. Thus, a first pole of switch one 60A is in series with a first pole of switch two 61A, while a second pole of switch one 60B is in series with a second pole of switch two 61B. Each of these strings of contacts is used to switch one side of power source 63 to a hazardous load 64 (or a contactor's coil that controls hazardous power). Both strings of switches must be closed in order to connect power to the hazardous load 64. By monitoring the voltage (diagonally) from the power source side of one string of switches to the load (contactor's coil) side of the other string of switches and vice-versa as shown below, both strings of contacts can be monitored. If either set of switches fails to open during a safety event, the contactor will not be powered and hazardous power can't be applied. If at any point Va and Vb are not equal a switch fault or switch wiring fault has been detected, satisfying the monitoring function. If a contactor is used to power the hazardous load it must be separately monitored for proper operation.

Finally, before leaving discussion of fault monitoring and control sequencing system 6, it should be noted that this system also continuously monitors control system power 3B via a power detection relay 29 responsive to whether control hub 100 is receiving power. This feature allows control hub 100 to automatically force a controlled stop of any connected mechanical drives (as previously defined) if the unit (control hub 100) should be deprived of power for any reason, provided networked controls are used. Thus, if there is any termination of power to the unit, whether by inadvertent error on the part of the operator, because of power failure, or otherwise, this will be picked up by the monitoring processor 6D of fault monitoring and control sequencing system 6. The fault monitoring and control sequencing system 6 will issue a pre-emptive controlled stop command 6B to control network 19 and alert host computer 7 via control data lines 6A.

Figure 3:
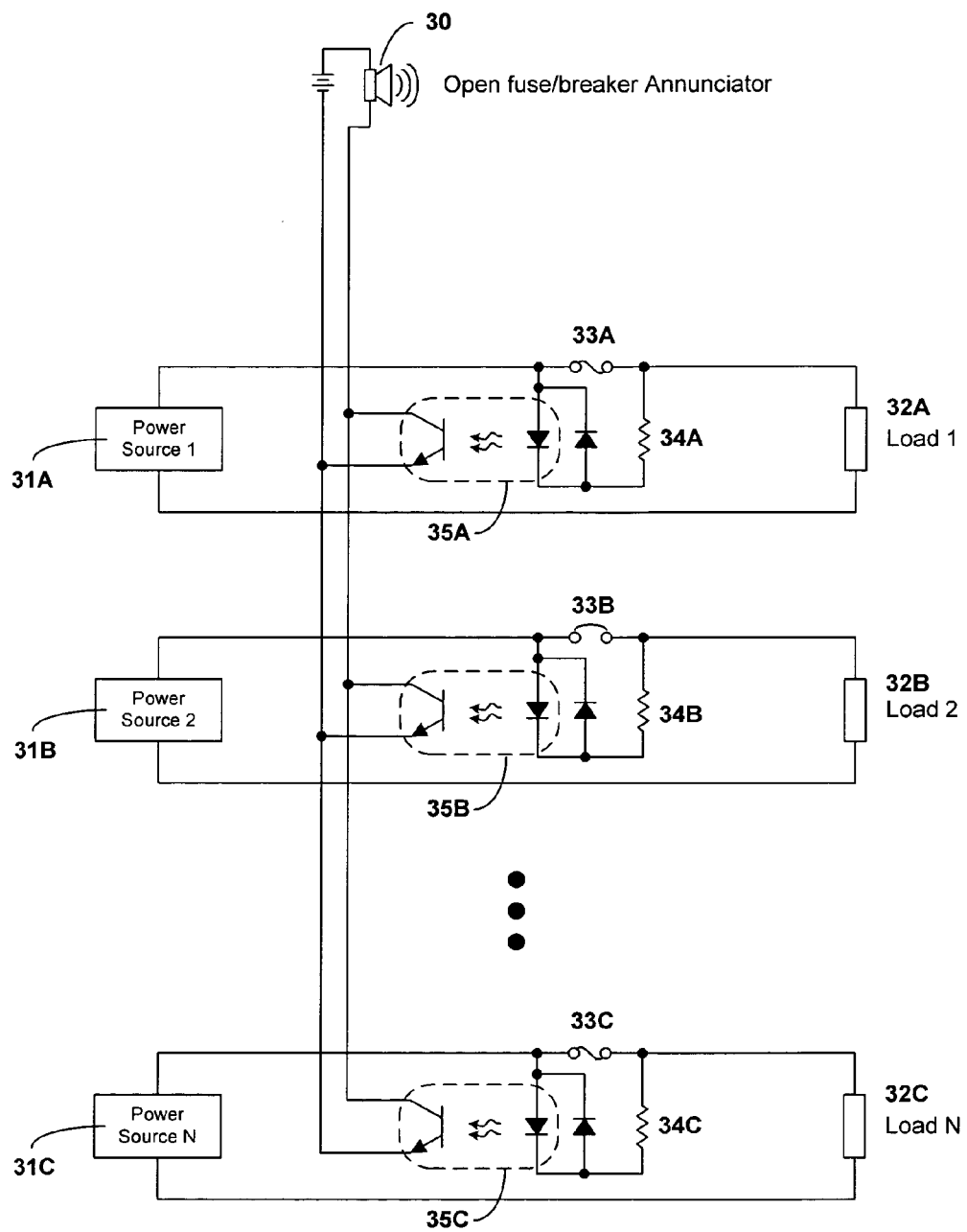
FIG. 3 provides a schematic diagram showing specific implementation hardware for the open fuse/circuit breaker annunciator of our invention.

FIG. 3 explores another aspect of the invention, providing a schematic diagram showing specific implementation hardware for the comprehensive overcurrent trip annunciator 30 of control hub 100, which will sound when a fuse or circuit breaker opens. (Actually, any type of appropriate signal device can be used, such as a light or alarm bell, but the annunciator 30 illustrated is preferred). From an exemplary standpoint, only the following are shown (although many more are possible): Three power sources (first power source 31A, second power source 31B, and third power source 31C); with respective loads (first load 32A, second load 32B, and third load 32C); and respective over current protection devices (first fuse 33A, circuit breaker 33B, and second fuse 33C). If any of the current protection devices 33A, 33B, and/or 33C opens/trips to protect the loads on its circuit, a small amount of current still flows from the circuit's power source 31A, 31B, and/or 31C to its respective load 32A, 32B, and/or 32C, via a respective sensor circuit as shown. Each sensor circuit includes a resistor (first resistor 34A, second resistor 34B, and third resistor 34B) and paired input LEDs interacting with photo-transistors to form respective opto-isolators—first opto-isolator 35A, second opto-isolator 35B, and third opto-isolator 35C. When any of the current protection devices 33A, 33B, and/or 33C opens to protect the loads on its circuit, the small amount of current that continues to flow through the input LEDs is enough to activate its respective opto-isolators 35A, 35B, and/or 35C. The amount of current involved is not enough to supply significant power to the load, so it is still safe, but it is enough to activate the load's opto-isolator and, thereby, to activate annunciator 30. Thus, hub 100 includes a comprehensive audible indicator that will sound if any one or more circuit protection devices break the circuit.

Figure 4A:
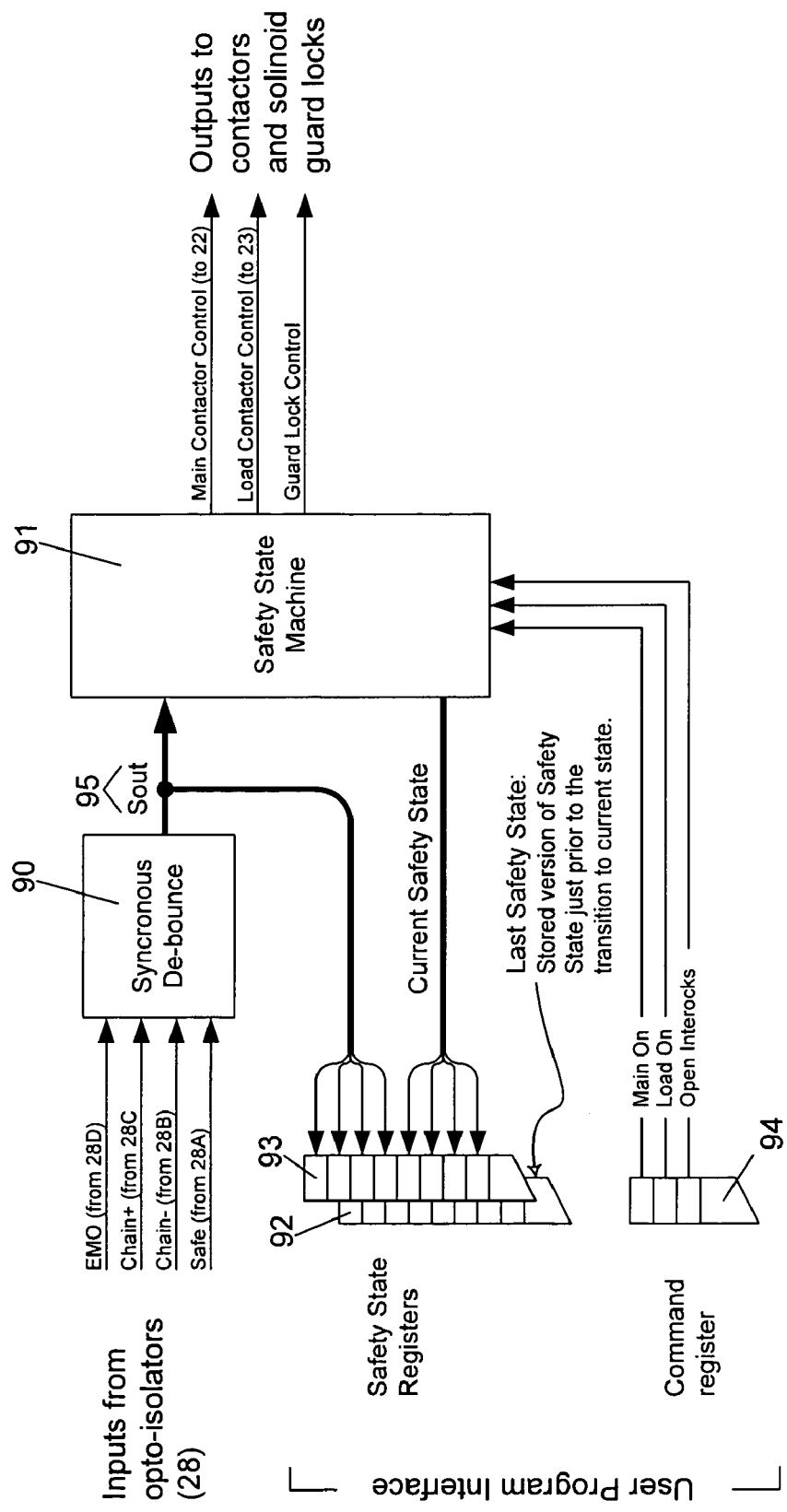
FIG. 4A provides a schematic overview illustrating the structure of the primary control software used in our invention.

FIG. 4A provides a schematic overview illustrating the structure of the primary control software of the invention which, along with monitoring processor 6D, is included in fault monitoring and control sequencing system 6. This software plays an integral part in the operations of monitoring processor 6D. It includes a synchronous de-bouncing algorithm 90 (which is described in more detail in FIG. 5) that receives and processes inputs received from opto-isolators 28A, 28B, 28C and 28D. Safety state machine 91 (which is described in more detail in reference to FIG. 4B) receives and is driven by state information (Sout) 95 received from synchronous de-bouncing algorithm 90 and machine commands received via command register 94 from the user program interface. Safety state machine 91 processes said information and/or commands and takes and/or dictates certain actions in accordance with the simplified monitor and control state diagram provided in FIG. 4B. Information/action related to the machine being monitored and controlled by control hub 100 is indicated in that figure by thin lines, while information/action from the host computer 7 (which is received via command register 94) is indicated in FIG. 4B by bold lines.

As will be further noted from review of FIG. 4A, safety state machine 91 and synchronous de-bouncing algorithm 90 constantly provide reports on, respectively, the current switch state Sout and the current safety state to safety state registers 92, 93 accessible via user program interface. The last safety state prior to the current safety state is stored in last safety state register 92, while the most current safety state is stored in current safety state register 93. These are constantly updated, providing a record of the last sequence of switching states prior to the occurrence of a fault which, once a fault occurs, can easily be decoded to isolate a small fraction of the fault tree that could have caused that error. This is accomplished simply and directly by referring to the state diagram illustrated in FIG. 4B. The operator first locates the current fault state of control hub 100 and equipment from reference to FIG. 4B and register 93, and compares this with the most immediate prior state stored in register 92. By knowing the state of the equipment and control hub 100 just prior to the occurrence of the fault as well as its current state, the point where error occurred can be easily isolated. For example, if the last state shown in register 92 is "OFF Check" [77] and the current state shown in register 93 is "Danger Fault" [82] it can easily be deduced that the main area contactor failed to open and is the source of the problem. As another example, if the current state shown in register 93 is "Soft Fault" [81] and the last state shown in register 92 is "Open" [75] it can be deduced that an error has occurred in the guard lock switch operation. By doing a failure mode effect analysis (FMEA) of possible failures and cataloging the resulting state of registers 92 and 93, a table can be built that can be used by the software on the Control Computer [7] that will pinpoint the cause of the error for the operator or service personnel.

Figure 4B:
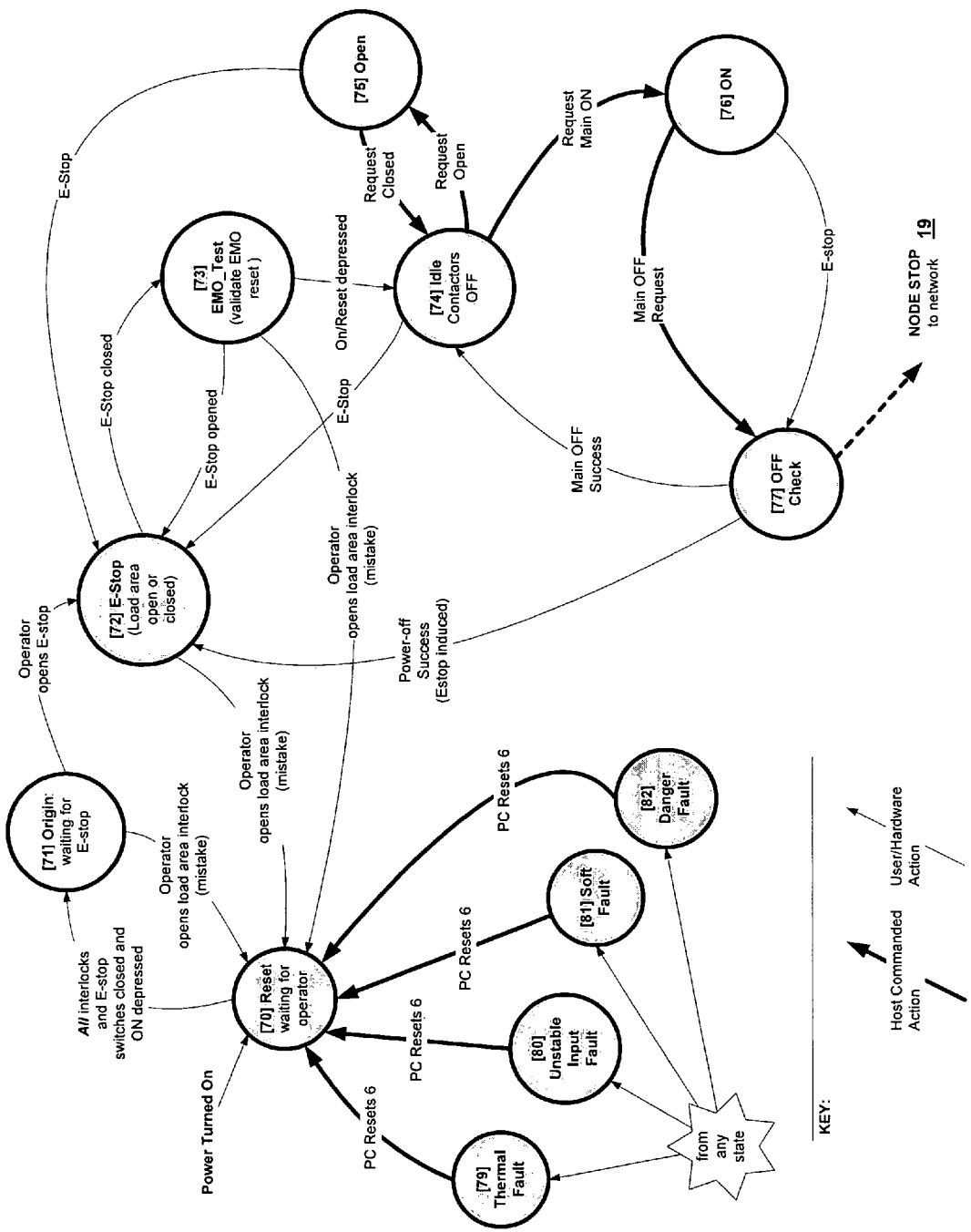
FIG. 4B provides a more detailed operational overview of the safety machine portion of the software diagrammed in FIG. 4A.

As previously noted, FIG. 4B provides a more detailed operational overview of the safety machine portion of the software diagrammed in FIG. 4A. FIG. 4B is basically a state diagram that uses reference bubbles to show the various monitoring and control states for control hub 100. In each one of these reference bubble states, processor 6D will do something specific in accordance with the software described herein. Reference arrows are directional, showing what action must occur in a state before movement to the state being pointed to can occur. This type of state programming method is well understood in the art, but it has not previously been used to force the operator to take certain actions (such as actuating certain safety devices in order to check them out) in order to move from one state to another. For example, when machine power is turned on, the program starts at reset state 70. The only way out of reset state 70 is shown, the operator must make sure that all interlocks and E-stop switches are closed and that the on switch is depressed. This moves the program to origin state 71.

In origin state 71 the system is in a state where the program and electronics can be checking to make sure that switches are closed and that all wiring is fault free when the switches are in the closed position. The next state is E-stop state 71, which is reached when the operator actually pushes or depresses (i.e., opens) the E-stop switch. At this point the software checks to make sure that both parts of the E-stop switch (as illustrated in FIG. 2A) are open. To advance to the next state (EMO test 73) the operator must actuate the E-stop switch. From here, the operator must reset the E-stop (and can do so in our invention via use of the on/EMO-reset button/switch as discussed further with reference to FIG. 6). This validates that the E-stop switch is working in a closed state and leads to the next state, idle state 74. At this point, the operator has tested the E-stop switch (closed or open) and all of the interlocks in closed state meeting safety specification requirements. And, as the foregoing discussion makes clear, the safety control and monitoring algorithm of our invention automatically forced the operator to perform the required testing, and forces the operator to test e-stop switches and interlocks in the machine each time the machine is powered up or reset.

From state 74, the operator can request to open guard-locks via the host computer 7 to access the interior of the machine, moving to open state 75. When the doors to the interior of the machine are closed again, the operator can request a closed state and move back to idle state 74. From idle state 74 the operator can also turn on hazardous loads by requesting that via host computer 7, moving to ON state 76. From here an E-stop or main off request will bring the machine to OFF check state 77, where the system is checked to make sure everything is off. If this is successful, operations return to E-stop 72 as previously described. However, in addition to the features previously discussed with regard to FIG. 4B, it should be noted that fault states are also included. Each of the operator states previously illustrated and discussed (states 70 through 77) include error checks by the program. If any errors are detected, the program automatically moves from the relevant operator state (70 through 77) it is in to one of four fault states (thermal fault state 79, unstable input fault state 80, soft fault state 81, and danger fault state 82). From here, appropriate recovery steps via host computer 7 must be taken to advance from each such state back to reset state 70.

Figure 5:
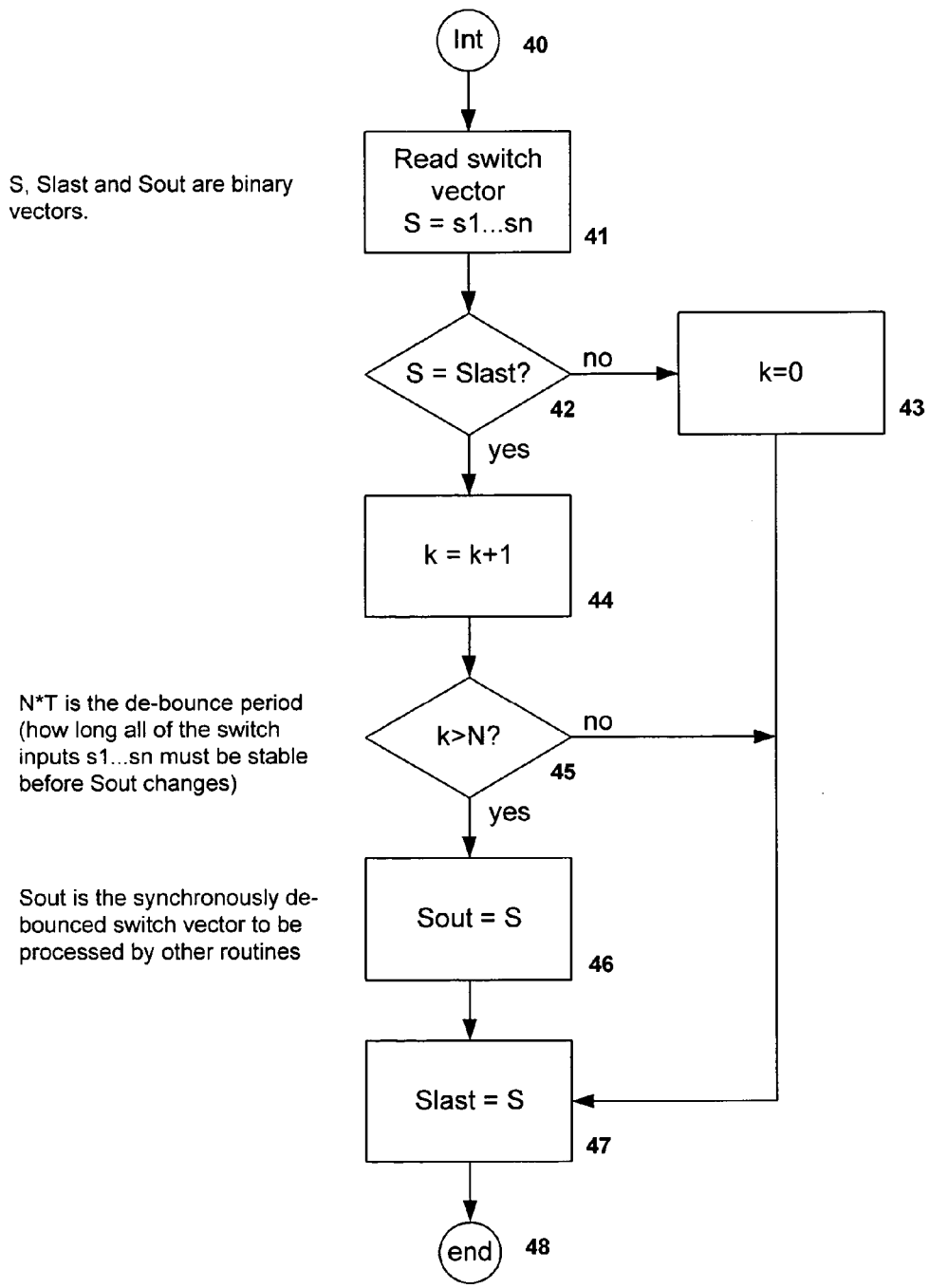
FIG. 5 provides a flow chart illustrating the operations of the synchronous de-bounce software and system of our invention.

FIG. 5 provides a flow chart illustrating the operations of the synchronous de-bounce system of our invention. This software processes the switch inputs as a vector, an extended binary number formed by a concatenation of the individual switch states (1 or 0). When transitions occur on switches the software looks at all of them and makes sure that they are all still stable, and then propagates that change in the whole state (i.e., the "vector" of the. switches) to the safety state machine 91 portion of the software. Safety state machine 91 is not, therefore, required to deal with separate inputs related to individual switch states and determine whether each one is stable. The switch states are dealt with as a whole, and the whole is only transmitted to the safety state machine 91 after a set period of timed examinations shows a stable state on all switches after some interrupt.

Thus, the routine illustrated at FIG. 5 begins with interrupt routine block 40, which runs as a periodic interval T. At read vector switch block 41, the next step, the software receives the current switch vector via input/output received by the processor from various locations. The individual switch states received are combined to form a single extended digital sequence expressing a vector. In the next step, at comparison block 42, the current vector state "S" is compared with the last stored vector state "Slast" and, if they are not equal, then K (a counter for the number of T interval iterations) is set to zero (in zero block 43) and the routine proceeds to state value reset block 47 where the current vector state from block 41 becomes the new Slast. The loop ends at block 48 and returns to the beginning, once again comparing the new Slast to the most current vector state "S" at block 42. If the two are different, K will be set once again at 0 and the current vector state will become the new Slast at block 47. This cycle will continue until the state vector stabilizes enough for Slast to equal the current measured state "S" at block 42. If this happens, the counter K is advanced one (at counter advance block 44) and it is determined whether there have been enough iterations with a stable vector state (by comparison with a preset number N at number comparison block 45) to define S as Sout. If N has not been reached, the routine advances to block 47 and repeats from there (checking new vector state inputs S against Slast to see if S has stabilized). On the other hand, if it has been reached, the routine forwards S as Sout (in Sout block 46) to safety state machine 91 as illustrated in FIG. 4A.

Figure 6:
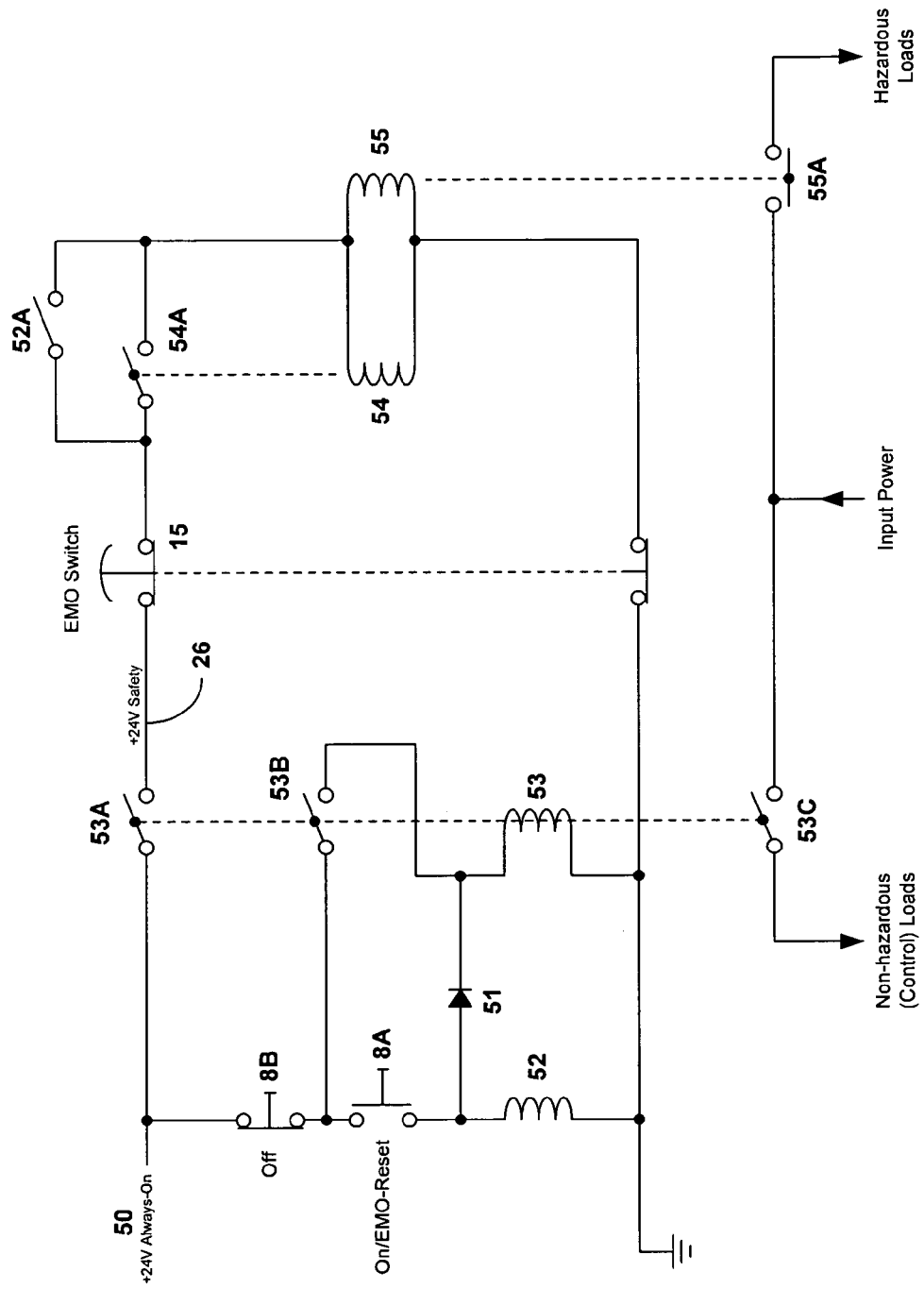
FIG. 6 provides a schematic diagram for the power control system for hazardous and non-hazardous loads of our invention.

FIG. 6 provides a simplified schematic diagram for the power control system for hazardous and non-hazardous loads of our invention (i.e.-on-off control system 3). In this context it should once again be remembered that, for safety purposes following an EMO/E-stop event, the EMO switch 15 needs to be returned to closed position and the operator must go to another location and press a reset switch. However, in our invention, by means of the arrangement illustrated, the EMO/E-stop switch is reset by operation of the machines front panel "on" switch 8A.

In this figure, actuating solenoids are paired by number with the switches they operate. Thus, first solenoid 52 closes first solenoid relay 52A when powered, second solenoid 53 closes second solenoid relays 53A, 53B and 53C when powered, third solenoid 54 closes third solenoid relay 54A when powered, and fourth solenoid 55 closes fourth solenoid relay 55A when powered. Thus, the diagram can be taken as showing the circuit after the EMO switch 15 has been returned to its closed position, but before the system has been reset. Current source 50 is always on in order to provide power to this control circuit as necessary, but power to both hazardous and non-hazardous loads is still interrupted by relays 53C and 55A. However, as soon as on switch 8A is temporarily closed/depressed, power will flow to solenoids 52 and (via diode 51) solenoid 53.

Solenoid 53 will close relays 53A, 53B, and 53C, and all three relays contribute to the result sought. First, the closing of 53A sends power through 52A (which has been closed by solenoid 52) to activate solenoids 54 and 55. By closing relay 54A, solenoid 54 assures the supply of power to solenoid 55 after on switch 8A returns to its open position, cutting power to solenoid 52 and opening relay 52A. Solenoid 55 closes relay 55A restoring power to hazardous loads. Second, the closing of relay 53B assures a continuing supply of power to solenoid 53 after the on switch 8A returns to its open position, cutting power to solenoid 53 via D50. Third, the closing of 53C restores power to non-hazardous (control) loads. Finally, due to the arrangement described, off switch 8B can be used to completely cut off all power to the circuits shown by disconnecting the power flow to solenoid 53. Note that if the EMO/E-stop switch 15 is opened (struck) and then reset (closed), hazardous power will not be reapplied through contact 55A until the solenoid 55 is powered by contact 52A (which is closed when solenoid 52 is powered by the closure of switch 8A). Thus, switch 8A performs both the ON and EMO-Reset function as outlined earlier.

The foregoing features, as heretofore described and as illustrated in FIGS. 1 through 6, constitute a new and novel power and safety control hub 100 for overall power control, safety control and power distribution integrating fault tolerant power disconnect control, software monitoring of disconnect and multi-voltage power distribution and disconnect with non-hazardous power control, EMI filtering and multi-circuit current protection in a single unit. However, it should be remembered that numerous variations are possible without exceeding the scope of the inventive concepts described herein. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

PARTS LIST FOR DRAWING FIGURES

Main breaker 1
EMI filtering 2
On-off control 3
Control system power 3B
Fault tolerant hazardous power control system 4
Hazardous power contactors 5
Fault monitoring and control sequencing system 6
Control data lines 6A
Pre-emptive controlled stop command 6B
Control & monitoring connection 6C
Monitoring processor 6D
Control computer 7
Soft power shutdown signal 7A
Front panel control switch 8
Front panel "on" switch 8A
Front panel "off" switch 8B
Power distribution hub 9
Hazardous power dissipation loads 10
Safety fault alarm 11
Over-current annunciator 12
Thermostat 13
Cooling fan 14
Speed/thermostat monitoring signal 14A
EMO (or E-stop) switch 15
Interlocks with guard locking 16
Main area interlocks 16A
Load/unload interlocks 16B
Guard solenoid lock switches 17
Main area guard lock 17A
Load/unload area guard lock 17B
External power converters 18
Control network 19
Main area contactor 20
Load area contactor 21
Main contactor activation switch 22
Load/unload contactor activation switch 23
Main area hazardous loads 24
Load/unload area hazardous loads 25
Power source 26
Ground 26A
Hazardous power input 27
Main contactor actuator 27A
Load/unload contactor actuator 27B
Main contactor delay capacitor 27c
Load/unload contactor delay capacitor 27D
Safe mode opto-isolator 28A
First fault opto-isolator 28B
Second fault opto-isolator 28C
E-stop opto-isolator 28D
Power applied detection relay 29
Annunciator 30
First power source 31A
Second power source 31B
Third power source 31C
First load 32A
Second load 32B
Third load 32C
First fuse 33A
Circuit breaker 33B
Second fuse 33C
First resistor 34A
Second resistor 34B
Third resistor 34C
First opto-isolator 35A
Second opto-isolator 35B
Third opto-isolator 35C
Interrupt routine block 40
Read switch vector block 41
Comparison block 42
Zero block 43
Counter advance block 44
Number comparison block 45
Sout block 46
State value reset block 47
End block 48
Current source 50
Diode 51
First solenoid 52
First solenoid relay 52A
Second solenoid 53
Second solenoid relays 53A, 53B, and 53C
Third solenoid 54
Third solenoid relay 54A
Fourth solenoid 55
Fourth solenoid relay 55A
First pole of switch one 60A
Second pole of switch one 60B
First pole of switch two 61A
Second pole of switch two 61B
Power source 63
Hazardous load 64
Reset state 70
Origin state 71
E-stop state 72
EMO test state 73
Idle state 74
Open state 75
ON state 76
OFF check state 77
Thermal fault state 79
Unstable input fault state 80
Soft fault state 81
Danger fault state 82
Synchronous de-bouncing algorithm 90
Safety state machine 91
Last safety state register 92
Current safety state register 93
Command register 94
State information (Sout) 95

Control hub 100

What is claimed is:

1. A method of power and safety control for equipment having at least one load/unload area and main machine/equipment area and mechanical drives and power supplies for said equipment, comprising:
providing apparatus intermediate said equipment, and user control apparatus and power supplies for said equipment;
wherein said apparatus integrates fault tolerant power disconnect control, monitoring of disconnect, and multi-voltage power distribution and disconnect; and
wherein said apparatus is an integrated system, further integrating segmented hazardous power control to at least one load/unload area and main machine/equipment area so that a main machine/equipment area can be operating while a load/unload area has power disconnected.

2. A method of power and safety control for equipment having mechanical drives and power supplies for said equipment, comprising:
providing apparatus intermediate said equipment, and user control apparatus and power supplies for said equipment;
wherein said apparatus integrates hazardous power disconnect; and
wherein said apparatus coordinates the stopping of any connected mechanical drives by issuing a controlled stop command via a control data network commanding them to come to a controlled stop before a safety power disconnect of hazardous power, and said apparatus automatically discharging energy sources within mechanical drives when there is a safety power disconnect of hazardous power.

3. A method of power and safety control as described in claim 2, further comprising said apparatus integrating segmented hazardous power control to at least one load/unload area and main machine/equipment areas so that a main machine/equipment area can be operating while the load/unload area has power disconnected.

4. A method of power and safety control as described in claim 2, further comprising said apparatus automatically forcing a safety power disconnect of hazardous power if at least one of the following occurs: the apparatus approaches its maximum operating temperature, and a cooling fan for the apparatus fails to operate properly.

5. A method of power and safety control as described in claim 2, further comprising said apparatus coordinating the stopping of any connected mechanical drives by issuing a controlled stop command via a control data network commanding them to come to a controlled stop when power to the apparatus is terminated.

6. A method of power and safety control as described in claim 1, further comprising said apparatus automatically discharging energy sources within any connected mechanical drives when there is a safety power disconnect of hazardous power.

7. A method of power and safety control as described in claim 6, further comprising said apparatus coordinating the stopping of any connected mechanical drives by issuing a controlled stop command via a control data network commanding them to come to a controlled stop when power to the apparatus is terminated.

8. A method of power and safety control as described in claim 1, further comprising said apparatus integrating a comprehensive overcurrent trip indicator and individual overcurrent indicators in a power distribution system, further comprising the step of sounding an comprehensive audible indicator if any current protection devices in the power distribution system are non-conducting.

9. A method of power and safety control as described in claim 1, further comprising said apparatus enabling an e-stop reset function integrated into a machine on-off front panel switch.

10. A method of power and safety control as described in claim 1, further comprising providing a "soft-off" circuit in said apparatus that automatically shuts off the equipment when power supply voltage to a host computer is shut down by a user or a software event.

11. A method of power and safety control as described in claim 1, further comprising the step of coordinating the stopping of any connected mechanical drives by issuing a controlled stop command via a control data network commanding them to come to a controlled stop when power to the apparatus is terminated.

12. A method of power and safety control for equipment and power supplies for said equipment, comprising:
providing apparatus intermediate said equipment, and user control apparatus and power supplies for said equipment; and
wherein said apparatus utilizes electromagnetic, single fault tolerant, safety control circuits that do not use positively driven contact relays, said control circuits instead connecting e-stop and interlocks with one pole of each switch inserted in series with one pole from every other switch forming two separate strings of switches.

13. A method of power and safety control as described in claim 12, wherein each of the strings of switches is used to switch one side of the power to a at least one of: a hazardous load and an element that controls a hazardous load.

14. A method of power and safety control as described in claim 12, wherein both strings of switches must be closed in order to connect power to the hazardous load.

15. A method of power and safety control as described in claim 12, wherein by monitoring the voltage diagonally from the power source side of one string of switches to the load or contactor's coil side of the other string of switches and vice-versa, both strings of switches can be monitored.

16. A method of power and safety control as described in claim 12, further comprising said apparatus coordinating the stopping of any connected mechanical drives by commanding them to come to a controlled stop before a safety power disconnect of hazardous power.

17. A method of power and safety control as described in claim 12, further comprising said apparatus integrating segmented hazardous power control to load/unload and main machine/equipment areas so that a main machine/equipment area can be operating while the load/unload area has power disconnected.

18. A method of power and safety control as described in claim 12, further comprising said apparatus automatically discharging energy sources within any connected mechanical drives when there is a safety power disconnect of hazardous power.

19. A method of power and safety control as described in claim 12, further comprising said apparatus providing a safety control and monitoring algorithm, which algorithm automatically forces an operator to test at least one of e-stop switches and interlocks in a machine each time the machine is at least one of powered up and reset.

20. A method of power and safety control as described in claim 12, further comprising said apparatus providing a state driven safety control and monitoring algorithm that pinpoints at least one of wiring and device problems for rapid debug.

21. A method of power and safety control as described in claim 12, further comprising said apparatus providing safety monitoring software for the synchronous de-bouncing of interlock and e-stop switch inputs as a vector to eliminate false trips, where a vector is a binary number formed by a sequence of individual switch states.

22. A method of power and safety control for equipment and power supplies for said equipment, comprising:
providing apparatus intermediate said equipment, and user control apparatus and power supplies for said equipment; and
wherein said apparatus utilizes a safety control and monitoring algorithm, which algorithm automatically forces an operator to test at least one of e-stop switches and interlocks in a machine each time the machine is at least one of powered up and reset.

23. A method of power and safety control as described in claim 22, further comprising said apparatus providing a state driven safety control and monitoring algorithm that pinpoints at least one of wiring and device problems for rapid debug.

24. A method of power and safety control as described in claim 22, further comprising said apparatus providing safety monitoring software for the synchronous de-bouncing of interlock and e-stop switch inputs as a vector to eliminate false trips, where a vector is a binary number formed by a sequence of individual switch states.

25. A method of power and safety control for equipment and power supplies for said equipment, comprising:
providing apparatus intermediate said equipment, and user control apparatus and power supplies for said equipment; and
wherein said apparatus utilizes a state driven safety control and monitoring algorithm that pinpoints at least one of wiring and device problems for rapid debug, wherein the algorithm stores in memory the last sequence of switching states such that, once an error occurs, said last sequence of switching states can be used to isolate a portion of a fault tree to isolate a cause of the error.

26. A method of power and safety control as described in claim 4, wherein the apparatus warns the user control apparatus and provides time for response prior to forcing a safety power disconnect of hazardous power.

27. A method of power and safety control for equipment and power supplies for said equipment, comprising:
providing apparatus intermediate said equipment, and user control apparatus and power supplies for said equipment; and
wherein said apparatus utilizes safety monitoring software for the synchronous de-bouncing of interlock and e-stop switch inputs as a vector to eliminate false trips, where said vector is a binary number formed by a sequence of individual switch states.

28. A method of power and safety control, as described in claim 27, wherein said monitoring uses a software algorithm constructed to de-bounce switches when several switches must be monitored for simultaneous operation.

29. A method of power and safety control for equipment and power supplies for said equipment, comprising:
providing apparatus intermediate said equipment, and user control apparatus and power supplies for said equipment; and
wherein said apparatus enables an e-stop reset function to be integrated into a machine on-off front panel switch.

30. A method of power and safety control as described in claim 29, wherein said unit integrates hazardous power reset switch function with the machine on-off front panel switch, allowing said on switch to double as a hazardous power reset switch.

31. A method of power and safety control as described in claim 29, wherein when the machine is powered off, actuating the on switch for the machine applies power to non-hazardous loads, and if all interlocks are closed and an e-stop switch is cycled to check for proper operation, a host controller can request hazardous power and it will be applied.

32. A method of power and safety control as described in claim 31, wherein if the foregoing steps have been completed and the e-stop switch is struck and then returned to the "run" position, a hazardous power request from the host will be ignored until the On switch is actuated, such that the On switch has a dual function as an "On-Reset" switch.

33. A method of power and safety control for equipment and power supplies for said equipment, comprising:
providing apparatus intermediate said equipment, and user control apparatus and said power supplies for said equipment; and
wherein said apparatus includes a "soft-off" circuit that automatically shuts off the equipment when the power supply voltage to a host computer is shut down by a user or a software event.

34. A method of power and safety control for equipment having mechanical drives and power supplies for said equipment, comprising:
providing apparatus intermediate said equipment, and user control apparatus and said power supplies for said equipment; and
wherein said apparatus coordinates the stopping of any connected mechanical drives by issuing a controlled stop command via a control data network commanding them to come to a controlled stop if power to the apparatus is terminated.

35. A method of power and safety control as described in claim 34, wherein said apparatus coordinates the stopping of connected mechanical drives when power to a power detection relay of said apparatus is terminated.

36. A method of power and safety control as described in claim 34, further comprising said apparatus automatically discharging energy sources within any connected mechanical drives when power to the apparatus is terminated.

* * * * *